United States Patent
Wang

(10) Patent No.: US 7,322,274 B2
(45) Date of Patent: Jan. 29, 2008

(54) AUTOMATIC LOCKING DEVICE FOR COFFEE BREWING APPARATUS

(76) Inventor: Dong-lei Wang, No. 1, Jinfeng Road, Tangjiawan Town, Xiangzhou District, Zahai City, Guangdong Province (CN)

( * ) Notice: Subject to any disclaimer, the term of this patent is extended or adjusted under 35 U.S.C. 154(b) by 0 days.

(21) Appl. No.: 11/283,645

(22) Filed: Nov. 21, 2005

(65) Prior Publication Data

US 2007/0034085 A1     Feb. 15, 2007

(30) Foreign Application Priority Data

Aug. 15, 2005   (CN) .................. 2005 2 0062845 U

(51) Int. Cl.
 *A47J 31/00* (2006.01)
(52) U.S. Cl. .................. 99/280; 99/295; 99/302 R
(58) Field of Classification Search .......... 99/280–285, 99/287–304, 323.3, 305–322; 222/53, 152
See application file for complete search history.

(56) References Cited

U.S. PATENT DOCUMENTS

| | | | | |
|---|---|---|---|---|
| 3,181,732 A | * | 5/1965 | Immermann et al. | 222/80 |
| 4,949,627 A | * | 8/1990 | Nordskog | 99/281 |
| 5,375,508 A | * | 12/1994 | Knepler et al. | 99/280 |
| 5,676,040 A | * | 10/1997 | Ford | 99/280 |
| 5,704,275 A | * | 1/1998 | Warne | 99/281 |
| 5,713,214 A | * | 2/1998 | Ugolini | 62/188 |
| 5,738,001 A | * | 4/1998 | Liverani | 99/283 |
| 5,896,806 A | * | 4/1999 | Dal Tio | 99/289 T |
| 5,953,981 A | * | 9/1999 | Lassota | 99/281 |
| 5,975,348 A | * | 11/1999 | Rudewicz et al. | 221/150 R |
| 6,047,630 A | * | 4/2000 | Brown et al. | 99/279 |
| 6,050,175 A | * | 4/2000 | Mirand et al. | 99/279 |
| 6,227,101 B1 | * | 5/2001 | Rabadi et al. | 99/280 |
| 6,990,891 B2 | * | 1/2006 | Tebo, Jr. | 99/295 |
| 2004/0244599 A1 | | 12/2004 | Wei | |

* cited by examiner

*Primary Examiner*—Timothy F. Simone
(74) *Attorney, Agent, or Firm*—Allen, Dyer, Doppelt, Milbrath & Gilchrist, P.A.

(57) ABSTRACT

This invention provides a locking device for coffee brewing apparatus of an automatic coffee maker. With this invention, when the top cover is closed, the brewing chamber can be locked and sealed at the same time automatically, while after coffee is brewed, the brewing chamber can be unlocked automatically, which provides easy operation that is convenient for users.

12 Claims, 6 Drawing Sheets

AUTOMATIC LOCKING DEVICE FOR COFFEE BREWING APPARATUS

CROSS-REFERENCE TO RELATED APPLICATION

This application claims priority from CN Patent Application No. 200520062845.X filed on Aug. 15, 2005, entitled "Locking Device for Coffee Brewing Apparatus", which is incorporated herein by reference for all purposes.

TECHNICAL FIELD

The present invention relates to a coffee maker, and in particular, to a locking device for a coffee brewing apparatus of a coffee maker. In accordance with the present invention, the brewing chamber of the coffee maker is locked automatically when the top cover of the coffee maker is closed so as to form a sealed coffee brewing chamber. Moreover, after the coffee is brewed, the sealed brewing chamber is unlocked automatically when the top cover is opened. The present invention is applicable to both an espresso coffee maker and a drip coffee maker.

BACKGROUND OF THE INVENTION

An espresso coffee maker or a drip coffee maker includes a top cover, a coffee maker body and a brewing chamber assembly. The brewing chamber assembly comprises: a brewing chamber cover fixed at the bottom of the top cover, a brewing chamber body fixed in the coffee maker body, a brewing chamber seat installed in the coffee maker body around the brewing chamber body, and a sealing ring installed between the brewing chamber cover and brewing chamber seat. Normally, the sealed brewing chamber is formed manually by the following steps: the first step is to close the top cover, and the second step is to rotate the brewing chamber seat about the vertical central axis of the brewing chamber body manually with the handle of the brewing chamber seat, so as to make the brewing chamber seat and the brewing chamber cover rotate relative to each other and become sealed. With the prior method, closing the top cover and forming the sealed brewing chamber had to be implemented in separate steps, the brewing chamber cover had to be aligned with the brewing chamber seat when rotating, and a relatively large force had to be applied due to the sealing ring provided in the brewing chamber seat. Accordingly, users found them inconvenient to operate.

An object of the present invention is to overcome the shortcomings of the prior art by providing a locking device for a coffee brewing apparatus of an automatic coffee maker, which automatically locks the coffee brewing chamber as the top cover is closed on the coffee maker body.

SUMMARY OF THE INVENTION

Accordingly, the present invention relates to an automatic coffee maker comprising a top cover, a coffee maker body, a pivot axis and a control circuit. The top cover is connected on the top of the coffee maker body via the pivot axis, whereby the top cover may be rotated about the pivot axis, enabling the opening and closing of the coffee maker. With the aid of the locking device for the coffee brewing apparatus, the brewing chamber of the coffee maker can be locked automatically, so as to form a sealed brewing chamber, at the same time as the top cover is closed.

The locking device for the coffee brewing apparatus comprises:
  a brewing chamber cover fixed at a bottom of the top cover, with at least one locking pin installed at a periphery of the brewing chamber cover;
  a brewing chamber body fixed in the coffee maker body;
  a brewing chamber seat in the coffee maker body disposed around the brewing chamber body rotatable around a vertical central axis of the brewing chamber body;
  at least one latching member engageable with the at least one locking pin extending inwardly at a periphery of the brewing chamber seat, whereby, when the brewing chamber seat is rotated around the vertical central axis, the locking device assumes one of an unlocked position and a locked position, wherein, in the unlocked position, the brewing chamber cover is rotatable about the pivot axis away from the brewing chamber seat, and in the locked position, the brewing chamber seat is locked in the vertical direction with the brewing chamber cover, and the brewing chamber cover is not rotatable about the pivot axis away from the brewing chamber seat;
  a motor installed in the coffee maker body controlled by the control circuit;
  a motion transmission mechanism disposed between the brewing chamber seat and the motor to enable the motor to drive the brewing chamber seat to rotate around the vertical central axis between the unlocked position and the locked position;
  a first sensor for detecting when the locking device is in the unlocked position and a second sensor for detecting when the locking device is in the locked position, which are both connected to the control circuit;
  wherein, when coffee is to be brewed, the top cover is closed on the coffee maker body and the motor is started by pressing down a start button, whereby under the control of the control circuit, the brewing chamber seat is driven via the motion transmission mechanism to rotate about the vertical central axis towards the locked position; when the brewing chamber seat arrives at the locked position, the second sensor is triggered, and the motor is stopped under the control of the control circuit, thereby locking the brewing chamber cover with the brewing chamber seat, so as to form a sealed brewing chamber; and
  wherein after coffee is brewed, the motor is re-started under the control of the control circuit, and the brewing chamber seat is driven via the motion transmission mechanism to rotate about the vertical central axis towards the unlocked position; when the brewing chamber seat arrives at the unlocked position, the first sensor is triggered, and the motor is stopped under the control of the control circuit, thereby unlocking the brewing chamber cover and enabling the brewing chamber cover to be rotated about the pivot axis away from the brewing chamber seat.

A sealing ring may be further installed at the periphery of the brewing chamber cover, so that, when the brewing chamber cover is engaged with the brewing chamber seat, the sealing ring is accommodated at the inner side of the periphery of the brewing chamber seat.

The motor may be either a step motor or a synchronous motor.

A moveable brewing chamber installation may be further disposed inside the brewing chamber body, so that, different brewing chamber installations for different purposes may be installed and changed based on desires, such as for brewing coffee, for brewing tea, etc.

According to the present invention, the brewing chamber can be locked and sealed automatically when the top cover is closed. Moreover, after the coffee is brewed, the brewing chamber can be unlocked automatically when the top cover is opened, which provides easy operation and is convenient for users.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

Figure 1:
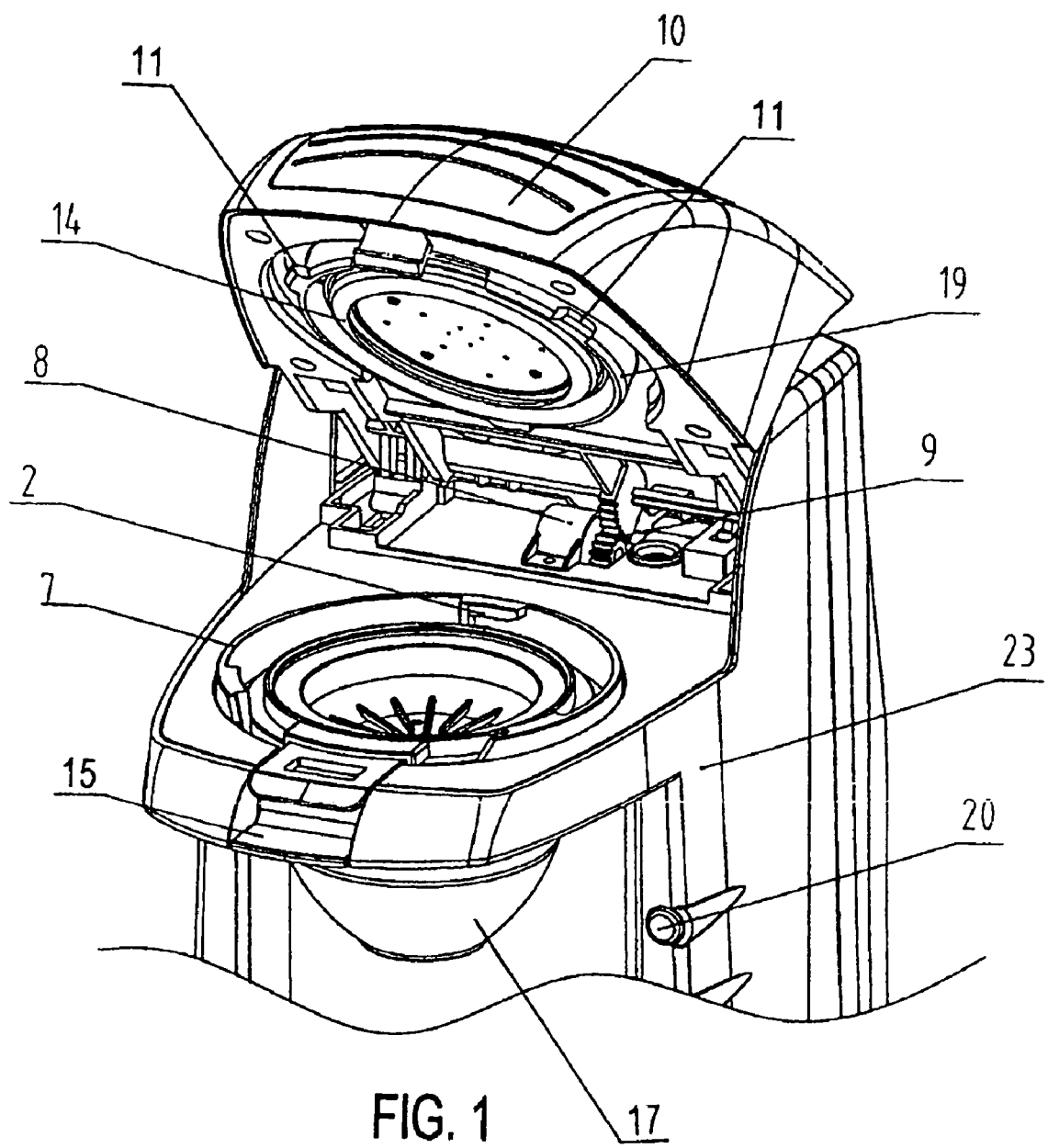
FIG. 1 is a schematic view of the locking device for a coffee brewing apparatus in accordance with one embodiment of the present invention, wherein the top cover is opened from the coffee maker body, showing the retarding mechanism for damping the closing motion of the top cover.
Figure 2:
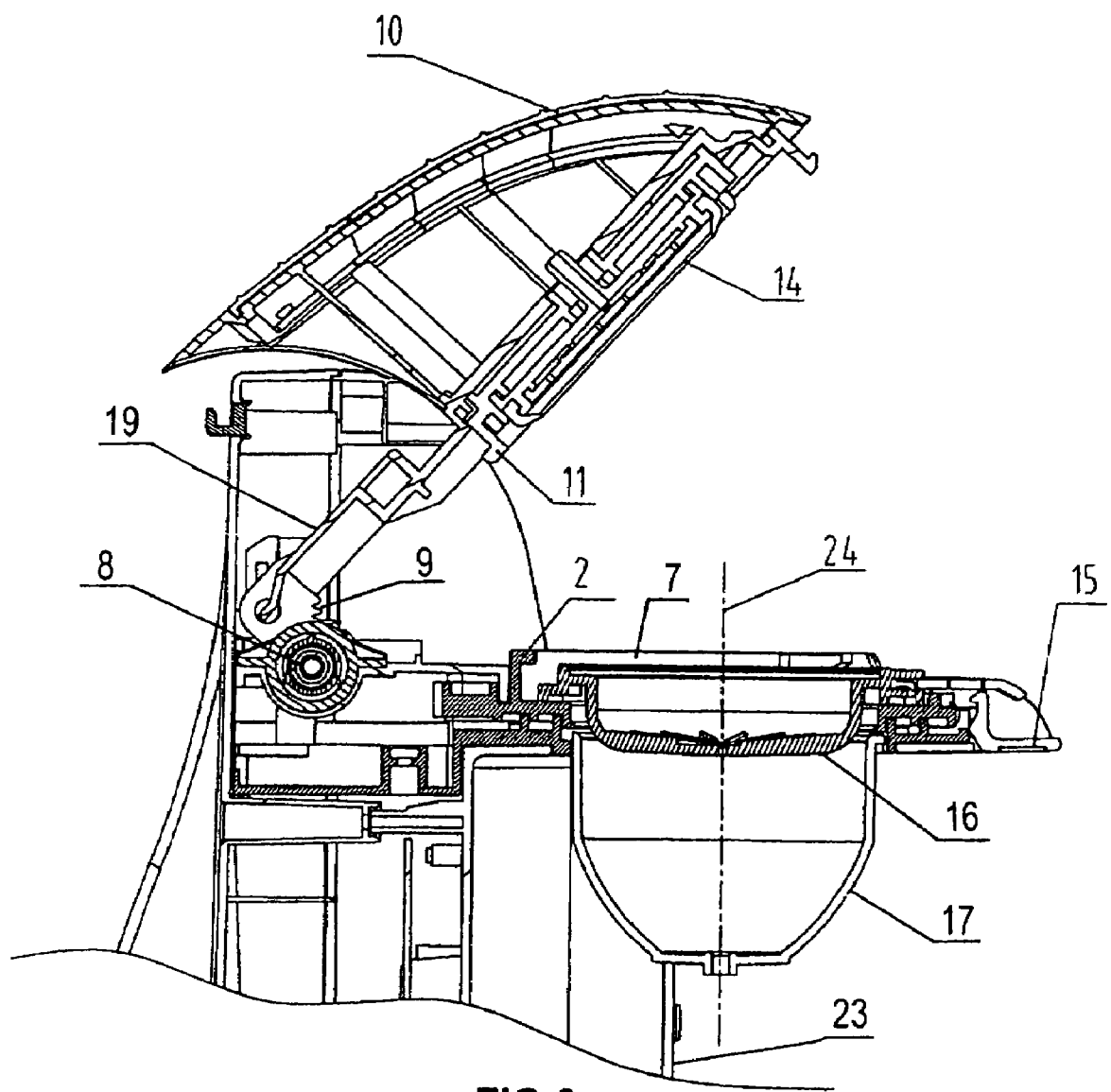
FIG. 2 is a cross-sectional view of the locking device for a coffee brewing apparatus of FIG. 1.
Figure 3:
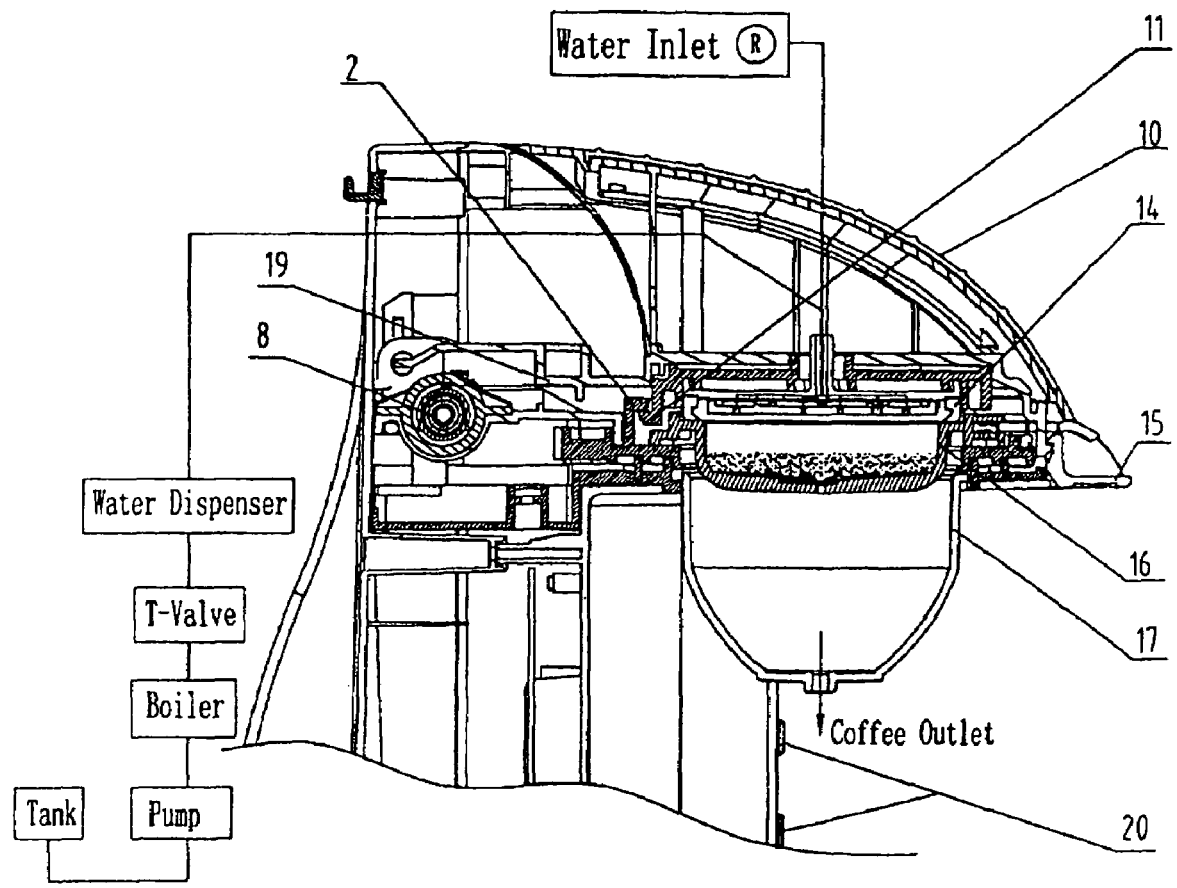
FIG. 3 is a cross-sectional view of the locking device for a coffee brewing apparatus of FIG. 1, wherein the top cover is closed on the coffee maker body.

As illustrated in FIGS. 1, 2 and 3, according to one embodiment of the present invention, an automatic coffee maker comprises a coffee maker body 23, a top cover 10, a pivot axis and a control circuit 25. The top cover 10 is connected on the top of the coffee maker body 23 via the pivot axis, whereby the top cover 10 is rotatable about the pivot axis, enabling the opening and closing of the coffee maker.

A locking device for a coffee brewing apparatus comprises a brewing chamber cover 19, a brewing chamber body 17, a brewing chamber seat 7, a synchronous motor 4, a motion transmission mechanism, a first sensor 21 for detecting when the locking device is in an unlocked position, and a second sensor 22 for detecting when the locking device is in a locked position.

The brewing chamber cover 19 is fixed at the bottom of the top cover 10. A sealing ring 14 is installed at the periphery of the brewing chamber cover 19, so that, when the brewing chamber cover 19 is engaged with the brewing chamber seat 7, the sealing ring 14 is accommodated at the inner side of the periphery of the brewing chamber seat 7. At the periphery of the brewing chamber cover 19, outside the sealing ring 14, several locking pins 11 are installed at an equal distance span, e.g. three locking pins 11 may be provided, each spaced 120° apart. The locking pins 11 may be formed integrally with the brewing chamber cover 19.

The brewing chamber body 17 is fixed in the coffee maker body 23 under the top cover 10. A moveable brewing chamber installation 16 may be further disposed inside the brewing chamber body 17, so that, different brewing chamber installations for different purposes may be installed and changed based on desires, such as for brewing coffee, for brewing tea, etc.

The brewing chamber seat 7 is installed in the coffee maker body 23 around the brewing chamber body 17. The brewing chamber seat 7 is rotatable around the vertical central axis 24 (see FIG. 2). Three latches 2 engageable with the three locking pins 11 are installed inwardly at the periphery of the brewing chamber seat 7, whereby, when the brewing chamber seat 7 is rotated around the vertical central axis 24, the locking device may assume one of an unlocked position and a locked position. In the locked position, the brewing chamber seat 7 is locked with the brewing chamber cover 19 in the vertical direction, and the brewing chamber cover 19 can not be rotated about the pivot axis away from the brewing chamber seat 7. The latches 2 may be formed integrally with the brewing chamber seat 7.

As shown in FIGS. 4A, 4B, 5 and 6, the synchronous motor 4 is installed in the coffee maker body 23 and controlled by the control circuit 25. Alternatively, the synchronous motor 4 can be replaced by a step motor.

The motion transmission mechanism includes a pinion 5 and a driven gear 3. The driven gear 3 is fixed at the periphery of the brewing chamber seat 7, and may be formed integrally therewith. The driven gear 3 extends within an angular span, e.g. up to about 22.5°.

Figure 4A:
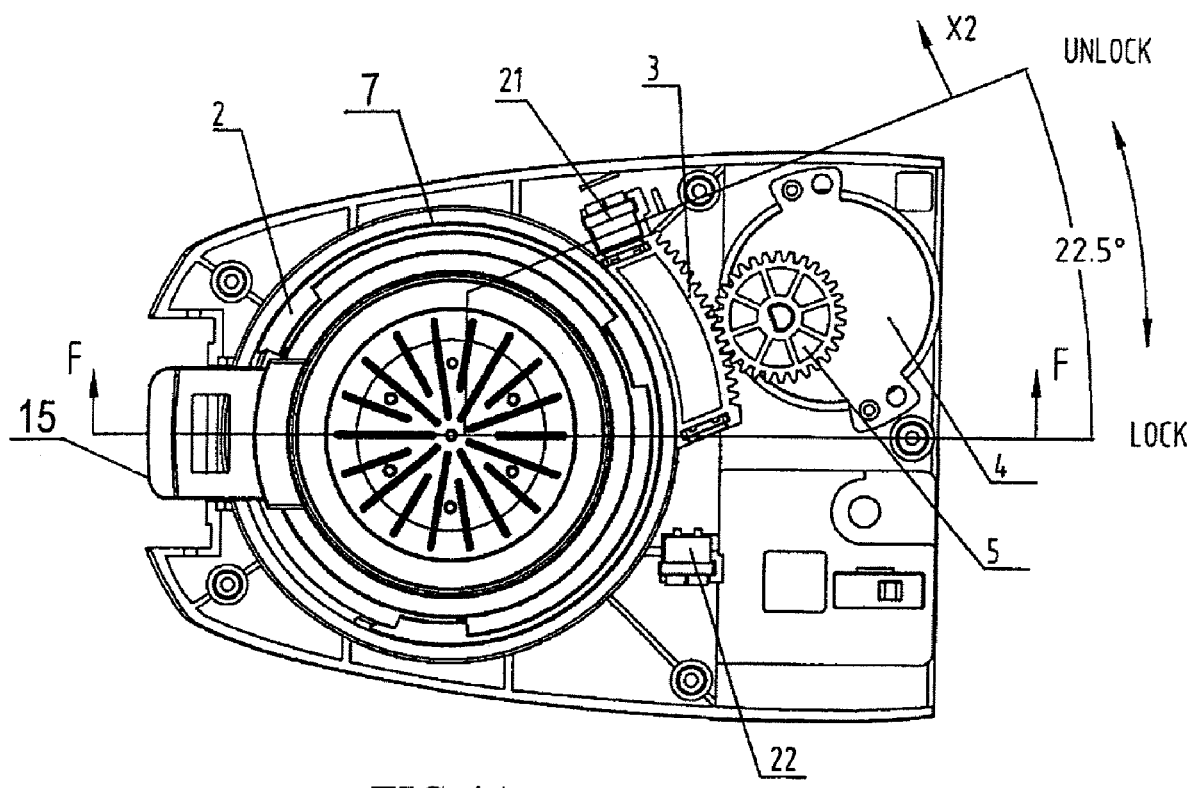
FIG. 4A is a plan view of the brewing chamber seat of the locking device for a coffee brewing apparatus in accordance with one embodiment of the present invention.
Figure 4B:
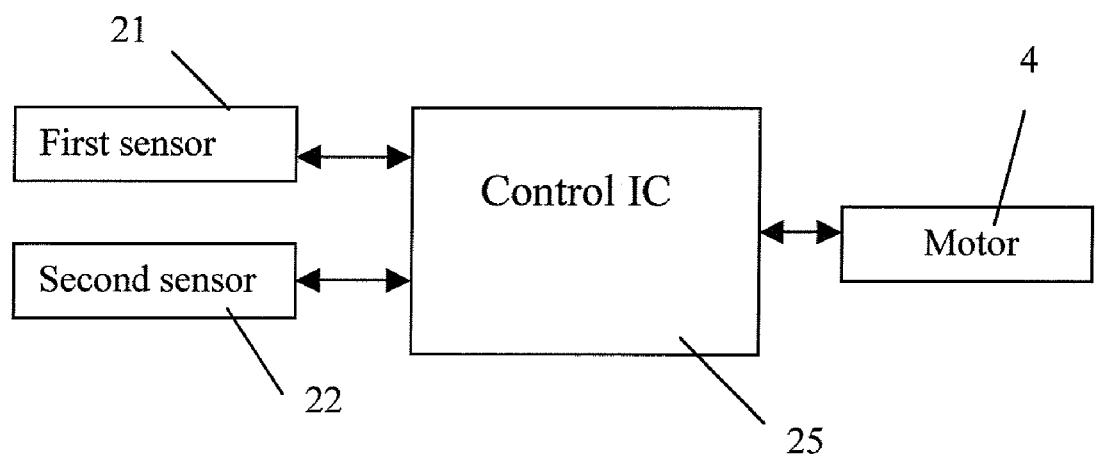
FIG. 4B is a schematic representation illustrating the control circuitry of the present invention.
Figure 5:
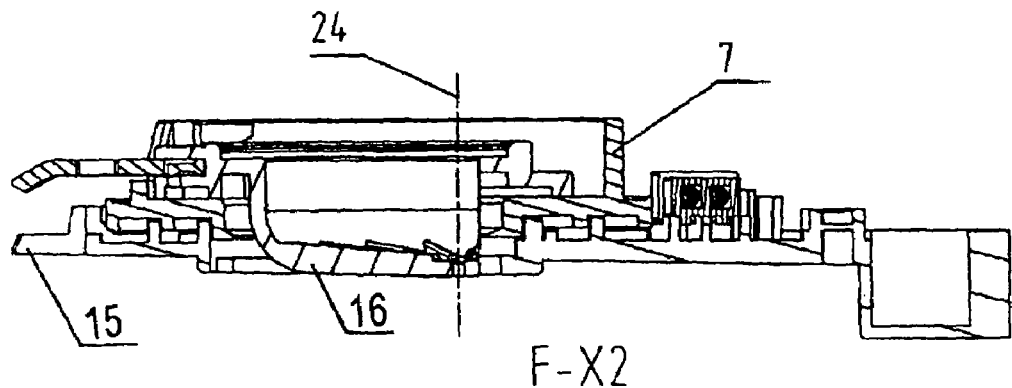
FIG. 5 is a cross-sectional view of FIG. 4 taken along F-X2.
Figure 6:
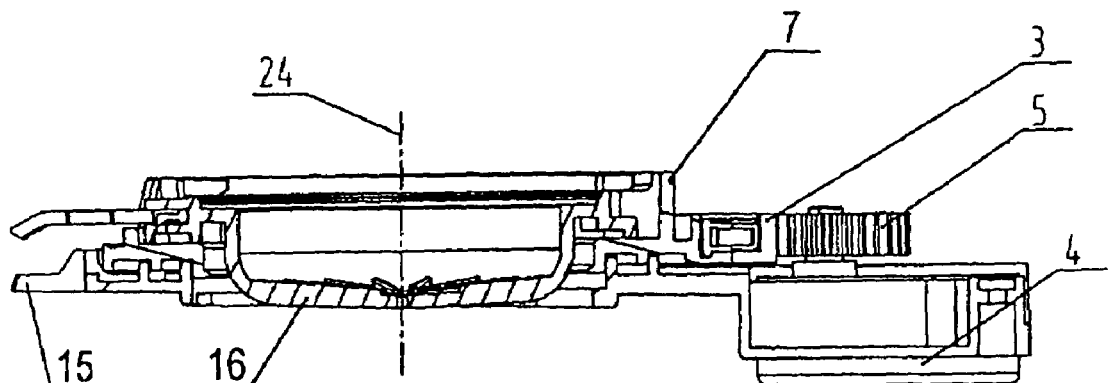
FIG. 6 is a cross-sectional view of FIG. 4 taken along F-F.

Both the first and second sensors 21 and 22 can use a micro switch, and both of the first and second sensors 21, 22 are connected with the control circuit. As shown in FIGS. 4A and 4B, the second sensor 22 and the first sensor 21 are installed at the right and left side of the driven gear 3, respectively. When the driven gear 3 is rotated to the right and arrives at the locked position, it touches the second sensor 22, whereby the second sensor 22 sends a locked signal to the control circuit 25. When the driven gear 3 is rotated to the left and arrives at the unlocked position, it touches the first sensor 21, whereby the first sensor 21 sends an unlocked signal to the control circuit 25.

When coffee is to be brewed, the top cover 10 is closed on the coffee maker body 23, and under the control of the control circuit 25, the synchronous motor 4 is started by pressing down the start button 20. The pinion 5 is rotated, driving the driven gear 3, which drives the brewing chamber seat 7 to rotate about the vertical central axis 24 clockwise for approximately 22.5°. When the brewing chamber seat 7 arrives at the locked position, the second sensor 22 is triggered, and the synchronous motor 4 is stopped under the control of the control circuit 25. As a result, the brewing chamber cover 19 is locked with the brewing chamber seat 7, 50 as to form a sealed brewing chamber. At this time, water in a reservoir (Tank) is pumped by a pump into a boiler to be heated, boiled water of 2.5-10 BAR is produced and enters into the sealed brewing chamber through a three way connector (T-Valve) and the water distribution installation (Water Dispenser), so as to brew coffee or tea. Details of the water loop of the coffee maker is described in the U.S. patent application filed on May 11, 2004 by the present Applicant, which is entitled "A Multi-Function Coffee Maker and Use Thereof" under the publication No. U.S. 2004/0244599. After coffee is brewed, the synchronous motor 4 is re-started under the control of the control circuit 25, whereby the pinion 5 is rotated, driving the driven gear 3, and the brewing chamber seat 7 is driven to rotate about the vertical central axis 24 anti-clockwise for 22.5°. When the brewing chamber seat 7 arrives at the unlocked position, the first sensor 21 is triggered, and the synchronous motor 4 is stopped under the control of the control circuit 25. As a result, the brewing chamber cover 19 is unlocked and can be rotated about the pivot axis away from the brewing chamber seat 7.

As shown in FIGS. 1, 2 and 3, an open button 15 for the top cover 10, and a retarding mechanism including damper 8 and damping gear 9 are installed on the coffee maker body 23. After coffee is brewed, the top cover 10 is opened steadily by pressing down the open button 15, with the aid of the damper 8 and damping gear 9, so as to be convenient for changing the coffee, the tea or the moveable brewing chamber installation 16 inside the brewing chamber body 17.

What is claimed is:

1. A locking device for a coffee brewing apparatus of an automatic coffee maker, the automatic coffee maker including a coffee maker body, a control circuit; and a top cover pivotally connected on top of said coffee maker body about a pivot axis, enabling the coffee maker to be opened and closed; said locking device comprising:
    a brewing chamber cover fixed at a bottom of said top cover, with at least one locking pin at a periphery of the brewing chamber cover, integral therewith;
    a brewing chamber body fixed in the coffee maker body;
    a brewing chamber seat in the coffee maker body disposed around said brewing chamber body and rotatable around a vertical central axis of said brewing chamber body;
    at least one latching member extending inwardly from said brewing chamber seat, whereby, when said brewing chamber seat is rotated around said vertical central axis, said locking device assumes one of an unlocked position and a locked position, wherein, in the unlocked position, the brewing chamber cover is rotatable about the pivot axis away from the brewing chamber seat, and in the locked position, said brewing chamber seat is locked in a vertical direction with said brewing chamber cover, and said brewing chamber cover can not be rotated about said pivot axis away from said brewing chamber seat;
    a motor installed in said coffee maker body controlled by said control circuit;
    a motion transmission mechanism disposed between said brewing chamber seat and said motor to enable said motor to drive said brewing chamber seat to rotate around said vertical central axis between the unlocked position and the locked position;
    a first sensor for detecting when the locking device is in the unlocked position and a second sensor for detecting when the locking device is in the locked position, which are both connected with said control circuit;
    wherein, when coffee is to be brewed, said top cover is closed on said coffee maker body, said motor is started by pressing down a start button, whereby under the control of said control circuit said brewing chamber seat is driven via said motion transmission mechanism to rotate about said vertical central axis towards the locked position; when said brewing chamber seat arrives at the locked position, the second sensor is triggered, and said motor is stopped under control of the control circuit, thereby locking said brewing chamber cover with said brewing chamber seat, so as to form a sealed brewing chamber; and
    wherein, after coffee is brewed, said motor is re-started under the control of the control circuit, and said brewing chamber seat is driven via said motion transmission mechanism to rotate about said vertical central axis towards the unlocked position; when said brewing chamber seat arrives at the unlocked position, the first sensor is triggered, and said motor is stopped under control of the control circuit, thereby unlocking said brewing chamber cover and enabling said brewing chamber cover to be rotated about said pivot axis away from said brewing chamber seat.

2. The locking device according to claim 1, further comprising a sealing ring installed at the periphery of said brewing chamber cover, so that, when said brewing chamber cover is engaged with said brewing chamber seat, said sealing ring is accommodated at the inner side of the periphery of said brewing chamber seat.

3. The locking device according to claim 2, wherein said at least one locking pin is installed at the periphery of the brewing chamber cover outside the sealing ring.

4. The locking device according to claim 1, wherein said motor comprises a step motor or a synchronous motor.

5. The locking device according to claim 1, further comprising a moveable brewing chamber installation disposed inside said brewing chamber body, and removable for different purposes.

6. The locking device according to claim 1, wherein said at least one locking pin is formed integrally with the brewing chamber cover.

7. The locking device according to claim 1, wherein said at least one latch is formed integrally with the brewing chamber seat.

8. The locking device according to claim 1, wherein said motion transmission mechanism includes a pinion and a driven gear, and wherein said driven gear is fixed at the periphery of the brewing chamber seat.

9. The locking device according to claim 8, wherein said driven gear is formed integrally with said brewing chamber seat.

10. The locking device according to claims 8, wherein said first and second sensors are disposed on opposite sides of said driven gear; whereby when said driven gear rotates and arrives at the locked position, it touches the second sensor, which sends a locking signal to the control circuit; and whereby when the driven gear rotates and arrives at the unlocked position, it touches the first sensor, which sends an unlocking signal to the control circuit.

11. The locking device according to claim 1, wherein both of the first and second sensors comprise a micro switch.

12. The locking device according to claim 1, further comprising an open button for the top cover, and a retarding mechanism including a damper and a damping gear, installed on the coffee maker body.

* * * * *